Figure 1:
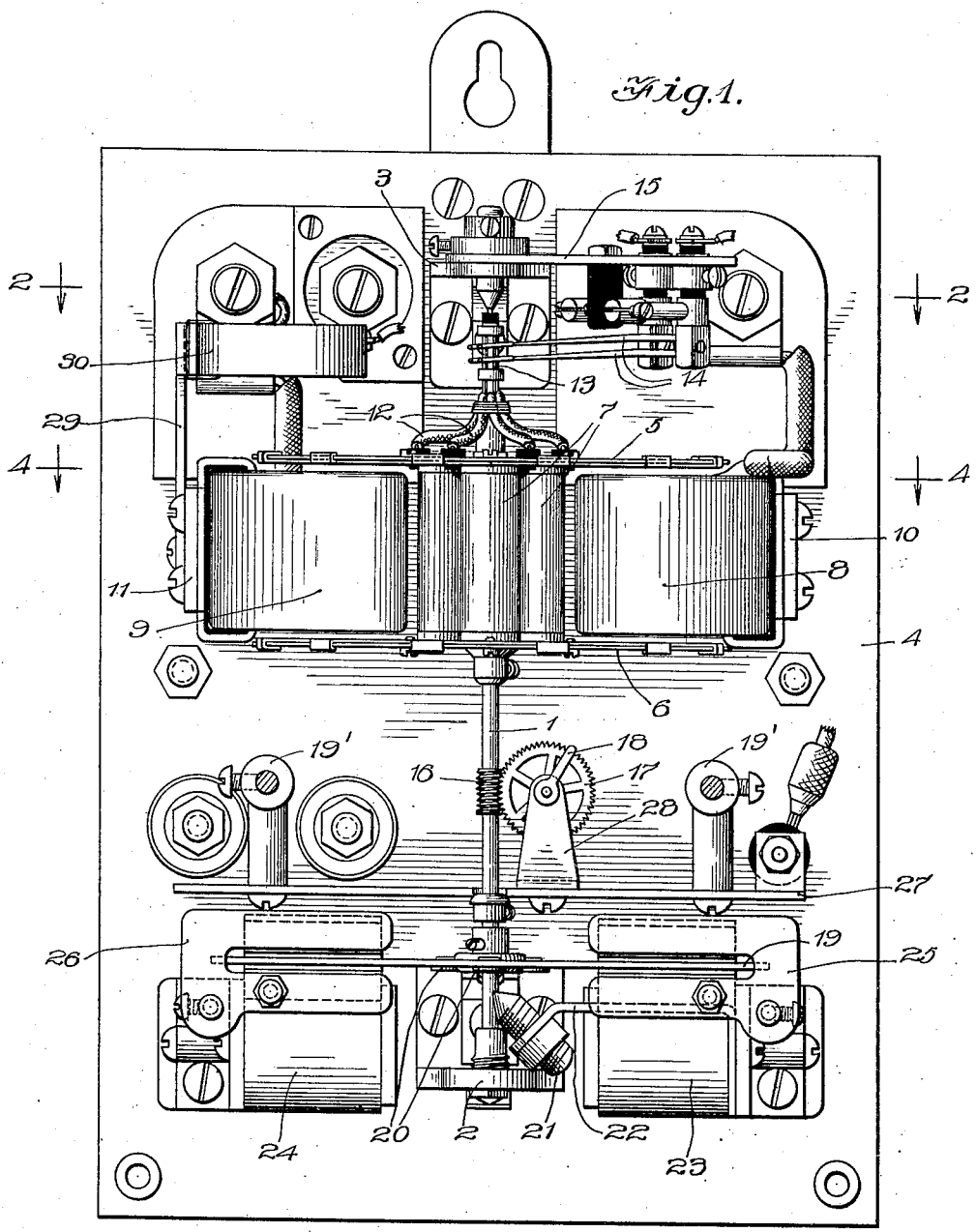

G. A. SCHEEFFER.
ELECTRIC METER.
APPLICATION FILED JAN. 14, 1910.

1,032,301.

Patented July 9, 1912.

3 SHEETS—SHEET 1.

Witnesses
Leonard E. Bogue
Frank J. Thelen

Inventor
Gustave A. Scheeffer
by Bruno Williams
Attys.

G. A. SCHEEFFER.
ELECTRIC METER.
APPLICATION FILED JAN. 14, 1910.
1,032,301.
Patented July 9, 1912.
3 SHEETS—SHEET 2.
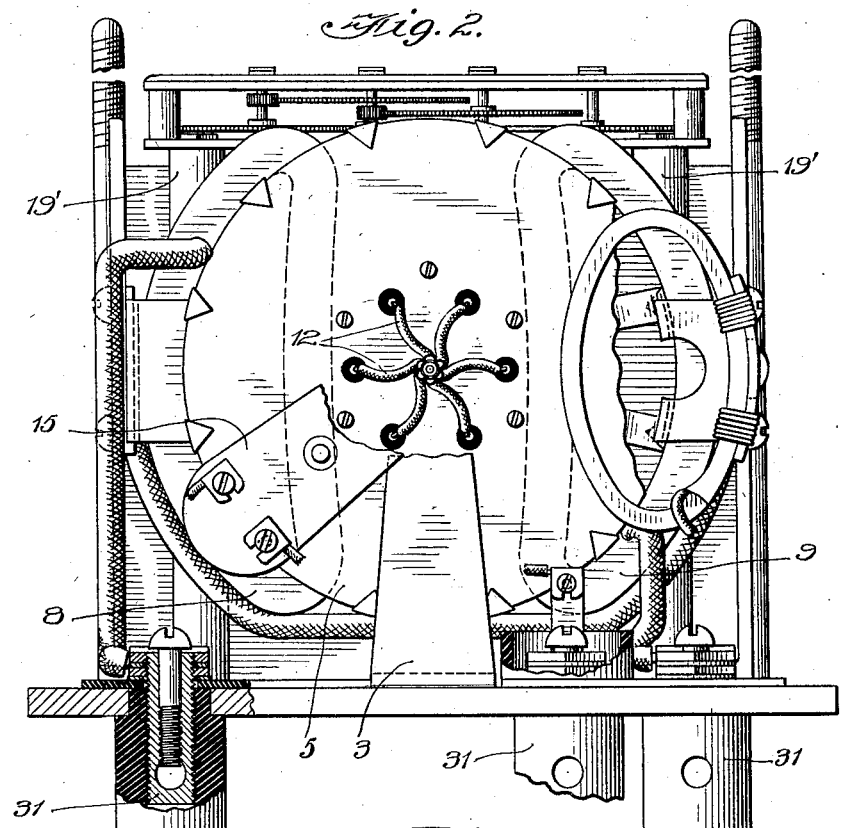
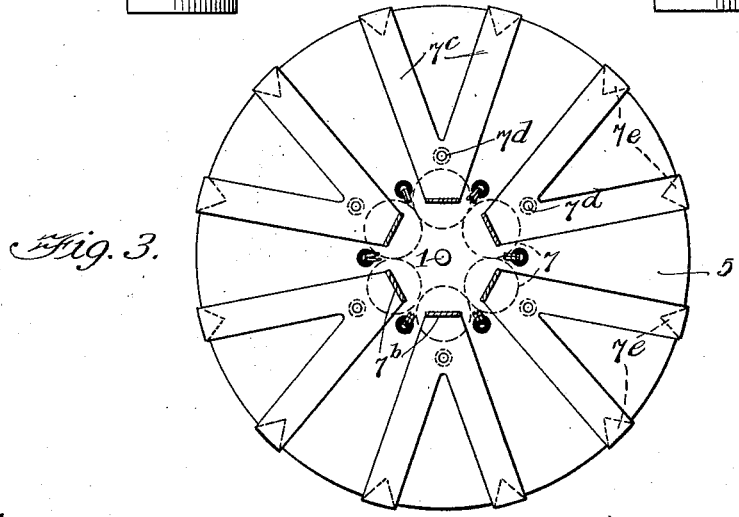
Witnesses:
Urw H Yagle
Leonard C. Bogue
Inventor:
Gustave A. Scheeffer
by
Attys.

G. A. SCHEEFFER.
ELECTRIC METER.
APPLICATION FILED JAN. 14, 1910.
1,032,301.
Patented July 9, 1912.
3 SHEETS—SHEET 3.
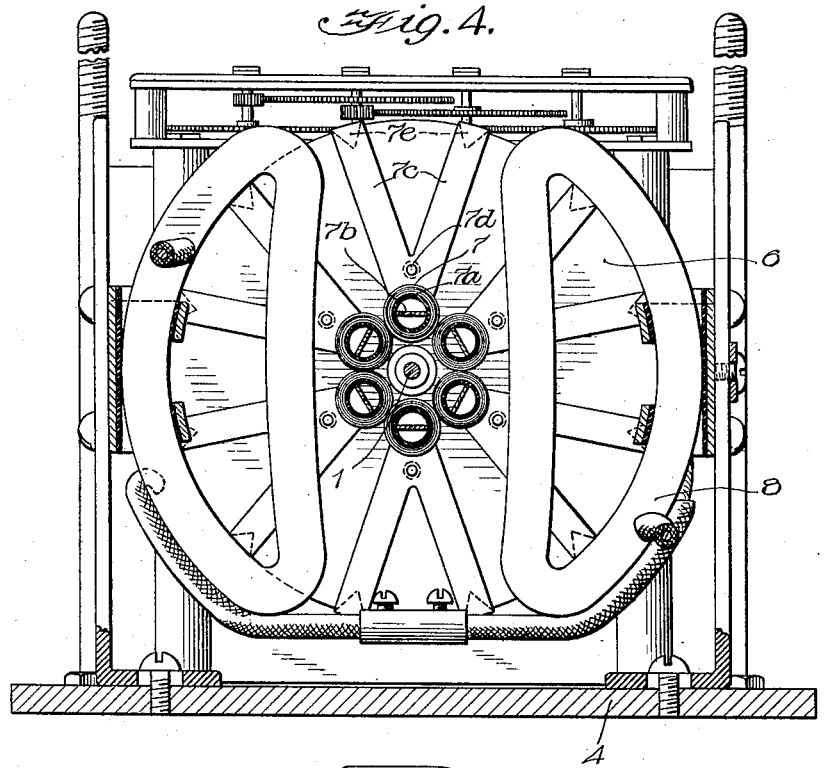
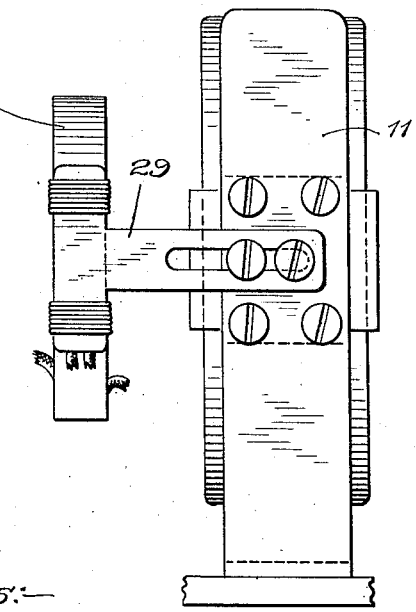
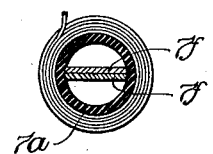
Witnesses:—
Chas. H. Yagle
Leonard E. Bogue
Inventor:—
Gustave A. Scheeffer
by Bruno William
Attys.

UNITED STATES PATENT OFFICE.

GUSTAVE A. SCHEEFFER, OF INDIANAPOLIS, INDIANA, ASSIGNOR TO COLUMBIA METER COMPANY, OF INDIANAPOLIS, INDIANA, A CORPORATION OF INDIANA.

ELECTRIC METER.

1,032,301. Specification of Letters Patent. Patented July 9, 1912.

Application filed January 14, 1910. Serial No. 538,029.

*To all whom it may concern:*

Be it known that I, GUSTAVE A. SCHEEFFER, a citizen of the United States, residing at Indianapolis, in the county of Marion and State of Indiana, have invented a certain new and useful Improvement in Electric Meters, of which the following is a full, clear, concise, and exact description, reference being had to the accompanying draw10 ings, forming a part of this specification.

My invention relates to an improved form of electric meters adapted to measure the quantity of electricity flowing through any given circuit.

My invention forming the subject matter of this application is particularly adapted for use in connection with generating plants from which electricity is distributed for use and by my invention I provide a meter construction in which the power required to drive the meter is very small and at the same time the meter is practically free from disturbing effects due to extraneous magnetic fields. For this reason the meter may be used without change in the accuracy of its operation upon switchboards in close proximity to other conductors carrying large currents or to generating machines producing magnetic fields of considerable strength around the switchboard.

The results described are secured in my invention by constructing the armature of the meter in such a manner as to reduce the reluctance of the path taken by the mag35 netic lines produced by the field coils without, however, introducing serious errors that would result from the use of large masses of iron as cores for the coils.

The several drawings illustrating my in40 vention are as follows:

Figure 1 is a front view of the meter in its assembled condition in the position it occupies during operation and in this figure the casing is removed to disclose the operat45 ing parts of the mechanism. The integrating mechanism used to indicate the reading of the meter is also removed in this figure. Fig. 2 is a transverse sectional view of the parts shown in Fig. 1 taken along the line 2—2. Fig. 3 is a detail view of one of the disks constituting a portion of the meter armature. Fig. 4 is a transverse sectional view of the parts shown in Fig. 1 taken along the line 4—4. Fig. 5 is a side view of one of the field coils, the bracket used to support the same from the base and the starting coil supported from such bracket. Fig. 6 is a transverse sectional view showing a modified form of armature coil.

Similar numerals refer to similar parts throughout the several views.

As shown in the drawings, an armature shaft 1 is supported by bearings 2 and 3 from a base plate 4. The shaft 1 has mounted thereon parallel disks 5 and 6 between which the armature coils 7 are secured. The coils 7 are disposed between the field coils 8 and 9 which, in turn, are supported from the base plate 4 by the brackets 10 and 11 between the disks 5 and 6. Each of the armature coils 7, as shown in Fig. 4, is wound upon a spool of insulating material $7^a$, through which a strip of magnetic material $7^b$, preferably of soft iron passes. At the ends of the coil 7, the strip $7^b$ is bent outward at practically right angles and formed at each end into two divergent members $7^c$ secured to the disks 5 and 6 by the rivets $7^d$ and the bent ends $7^e$. The coils 7 are connected by conductors 12 with the commutator 13 upon which the brushes 14 bear, these brushes being supported by means of a rocker arm 15 from the upper bearing 3 of the armature.

The armature shaft 1 carries a worm 16 coöperating with a worm wheel 17 which drives the arm 18 adapted to engage the integrating mechanism when in place upon the post 19'. Since the integrating mechanism may be of any desired type and constitutes no part of this invention, it is not here shown in detail.

The armature shaft carries near its lower end a retarding disk 19 of nonmagnetic material which is provided with a number of metallic studs 20 disposed adjacent to the adjustable magnetic pole 21 as they are rotated with the shaft 1. The magnetic pole 21 consists of a screw supported by a bracket 22 from the permanent magnet 23 supported by the base 4 so that its poles lie upon either side of the disk 19. A second permanent magnet 24 is similarly disposed relatively to the disk 19 upon the other side of the shaft 1. Magnetic shunts 25 and 26 of preferably soft iron or steel are associated with the magnets 23 and 24 to adjust the retarding effects of the magnets upon the disk 19 as desired. A shield 27 of magnetic material is supported by posts 19' between the permanent magnets 23 and 24 and the armature and field coils, such magnetic shield serving by means of the bracket 28 to support the worm wheel 17.

The combination of the metallic studs 20 with the adjustable magnetic pole 21 serves to cause a practically uniform distribution of rotative effort produced by the starting coil 30, and this combination is not claimed herein as it forms the subject-matter of my copending application, Serial No. 538,026, filed Jan. 14, 1910. The magnetic shunt mechanism associated with the magnets 23 and 24 is not claimed herein as it forms the subject-matter of my co-pending application, Serial No. 538,032, filed January 14, 1910.

The bracket 11 which supports the field coil 9 from the base plate 4 has adjustably secured thereto a bracket 29 which supports at its upper end the starting coil 30. As shown in Fig. 5, the bracket 29 may be moved upon the bracket 11 to bring the starting coil 30 nearer to the disk 5 or farther away from such disk as desired and thus the magnetic effect of the starting coil upon the armature may be varied as desired.

In Fig. 2, the integrating mechanism is shown in its operative position upon the posts 19' and in this figure a sectional view of the connecting post 31 used to make connections with the line circuit is also shown. It will be noticed that these connecting posts 31 are entirely inclosed in insulating material and that the binding screws may be operated only from within the meter and that this operation of connecting the outside conductors with the binding posts does not in any way interfere with the connections made to such posts inside of the meter itself.

In the modified form of armature coil shown in Fig. 6, two similar pieces of magnetic material 7$^f$ extend through the insulating tube 7$^a$ one of such pieces being extended at one end in a diverging member 7$^e$, while the other is similarly formed at the other end. This construction affords a more ready assembling of the parts than does the construction indicated in Figs. 3 and 4.

As a result of the construction shown and described, it will be seen that a good magnetic path is afforded from one side of each of the field coils through the armature coils to the other side of such field coil, the only air path being that part of the path extending between the disks 5 and 6 through the field coils. As a result a very efficient operation of the meter is secured, and furthermore, since the paths of magnetic material thus formed are thin, the undesirable effects due to inductive action are practically eliminated. A further advantage secured by this construction is that in the event of the meter being located in a strong magnetic field, the effect of the field coils remains unchanged, since the magnetized paths or cores extending through the armature coils will be strengthened at one end in proportion as they are weakened at the other end by such external magnetic fields and thus the resultant action upon such magnetized cores by the field coils will be the same as though the external field passing through the field coils were not present.

While I have shown my invention in the particular embodiments herein disclosed, I do not, however, limit myself to this construction but desire to claim broadly any equivalent construction that may suggest itself to those skilled in the art.

What I claim is:

1. In an electric meter, a rotatable armature consisting in the combination of a plurality of coils, and a separate magnetic core for each coil, each of such cores extended radially outward from one end of the coils, each of the outwardly extending ends of the cores being divided into a plurality of paths in substantially the same plane.

2. In an electric meter, a rotatable armature consisting in the combination of a plurality of coils, and a separate magnetic core for each coil, each of such cores extending radially outward from both ends of such coils, the radially extending ends of the cores being divided into a plurality of paths in substantially the same plane at each end of the cores.

3. In an electric meter, a rotatable armature consisting in the combination of a plurality of coils, a separate magnetic core for each coil, each of such cores extended in radial directions at one end of the coils, and a coreless field coil disposed with its end adjacent to the radially extending ends of the armature cores.

4. In an electric meter, a rotatable armature consisting in the combination of a plurality of coils, a separate magnetic core for each coil, each of such cores extended radially outward from one end of the coils, each of the outwardly extending ends of the cores being divided into a plurality of paths in substantially the same plane, and a coreless field coil disposed with its end adjacent to the ends of such magnetic paths.

5. In an electric meter, a rotatable armature consisting in the combination of a plurality of coils, a separate magnetic core for each coil, each of such cores extending radially outward from both ends of such coils, the radially extending ends of the cores being divided into a plurality of paths in substantially the same plane at each end of the cores, and a field coil having a non-magnetic core disposed between the ends of such magnetic paths.

6. In an electric meter, the combination of an armature having a plurality of windings, and a disk of nonmagnetic material disposed adjacent to such windings, each of such windings having an independent magnetic core extending outward radially and folded over the outer edge of such disk.

7. In an electric meter, the combination of an armature having a plurality of windings, and a disk of nonmagnetic material disposed adjacent to such windings on each end of the armature, each of such windings having an independent magnetic core, such cores extending outward radially and secured at their outer ends to such disk.

8. In an electric meter, the combination of an armature having a plurality of windings, and a disk of nonmagnetic material disposed adjacent to such windings on each end of the armature, each of such windings having an independent magnetic core extending outward at each end in a plurality of magnetic paths, the ends of each core being bent around the edges of such disks.

9. In an electric meter, the combination of an armature having a plurality of windings, a disk of nonmagnetic material disposed adjacent to such windings on each end of the armature, each of such windings having an independent magnetic core extending outward at each end in a plurality of magnetic paths, the ends of each core being bent around the edges of such disks, and a field coil disposed between the ends of such cores.

10. In an electric meter, the combination of an armature comprising a plurality of coils disposed substantially parallel with the axis of the armature, a strip of thin magnetic material extending through each coil, both ends of each strip bent so as to extend radially from such coils, each end of each strip split to constitute a plurality of paths and bent outward from the corresponding coil in substantially the same plane at each end, and a field coil in operative relation between such ends.

11. In an electric meter, the combination of an armature comprising a plurality of coils disposed substantially parallel with the axis of the armature, a shaft for supporting the armature, a disk of nonmagnetic material carried by the shaft adjacent to one end of the coils, a strip of thin magnetic material extending through each coil, each of such strips bent outward against such disk and secured at its outer end thereto, and a field coil disposed in inductive relation to the outer ends of such strips.

12. In an electric meter, the combination of an armature comprising a plurality of coils disposed substantially parallel with the axis of the armature, a shaft for supporting such armature, a disk of nonmagnetic material carried by the shaft adjacent to each end of such coils, a strip of thin magnetic material extending through each coil, each of such strips bent outward at each end against such disks and having its ends secured thereto, and a field coil located in inductive relation between the ends of such strips.

13. In an electric meter, the combination of an armature comprising a plurality of coils disposed substantially parallel with the axis of the armature, a shaft for supporting such armature, a disk of nonmagnetic material carried by the shaft adjacent to each end of such coils, a strip of thin magnetic material extending through each coil, each of such strips bent outward at each end adjacent to such disks and having its ends secured thereto, and two field coils located upon opposite sides of the armature in operative relation between the ends of such strips.

14. In an electric meter, the combination of an armature comprising a plurality of coils disposed substantially parallel with the axis of the armature, a shaft for supporting such armature, a disk of nonmagnetic material carried by the shaft adjacent to each end of such coils, a strip of thin magnetic material extending through each coil, the ends of such strips split and bent outward in different directions and secured at their outer ends to the adjacent disks, and two field coils located upon opposite sides of the armature in operative relation between such ends.

15. In an electric meter, an armature comprising a plurality of windings, and a disk of non-magnetic material disposed adjacent to such windings, each of such windings having an independent magnetic core extending radially from one end of the winding and having an end bent into engagement with the edge of the disk.

In witness whereof, I hereunto subscribe my name this 28th day of December, A. D. 1909.

GUSTAVE A. SCHEEFFER.

Witnesses:
 ALBERT L. RABB,
 JOHN E. SCOTT.

Copies of this patent may be obtained for five cents each, by addressing the "Commissioner of Patents, Washington, D. C."